United States Patent

[11] 3,556,074

| [72] | Inventors | Conrad J. Nelke; |
|---|---|---|
| | | John P. Brucker, Scottsdale, Ariz. |
| [21] | Appl. No. | 777,856 |
| [22] | Filed | Nov. 21, 1968 |
| [45] | Patented | Jan. 19, 1971 |
| [73] | Assignee | Motorola, Inc. |
| | | Franklin Park, Ill. |
| | | a corporation of Illinois |

[54] HYDRAULICALLY TENSIONED SAW ASSEMBLY
9 Claims, 3 Drawing Figs.

[52] U.S. Cl. .................................................. 125/15,
51/206, 51/73

[51] Int. Cl. ....................................................... B28d 1/04,
B24d 5/00, B24d 7/00

[50] Field of Search ............................................ 125/15;
51/206, 209, 73

[56] References Cited
UNITED STATES PATENTS
3,039,235  6/1962  Heinrich ........................ 51/73

| 3,175,548 | 3/1965 | Weiss ............................ | 51/73X |
| 3,396,714 | 8/1968 | Lauze ............................ | 125/15 |
| 2,713,339 | 7/1955 | Sayers ........................... | 125/15 |
| 3,324,539 | 6/1967 | Cleland ......................... | 125/15X |

*Primary Examiner*—Harold D. Whitehead
*Attorney*—Mueller & Aichele

ABSTRACT: An hydraulically tensioned annular saw assembly is described wherein the annular saw blade having an ID cutting edge is clamped between first and second annular support elements. The support elements each contain a circumferential recess therein. The recesses are in substantial registration on opposing sides of the blade when the blade is clamped. A channel is formed in one of the support elements and extends into the recess therein. A fluid is contained in the channel and corresponding recess. The application of pressure to the fluid results in a uniform tensioning of the saw blade. The blade is retensioned by varying the fluid pressure.

INVENTORS
John P. Brucker
Conrad J. Nelke
BY Mueller, Aichele, & Rauner
Attys

HYDRAULICALLY TENSIONED SAW ASSEMBLY

BACKGROUND OF THE INVENTION

This invention relates to an annular saw assembly of the type utilized in severing thin slices from hard and brittle materials and, in particular an assembly wherein the annular saw blade is hydraulically tensioned.

In the manufacture of electronic components, extensive use is made of crystalline materials, such as silicon and germanium. These crystals are of necessity very small in size and consequently it has been the practice to slice or cut a large grown crystal into relatively thin sheets. These sheets, commonly referred to as wafers, are of the order of .010 inch in thickness.

In general, slicing machines utilizing circular saw blades of an annular configuration wherein the cutting edge is located at the inner periphery of the saw blade have shown to be an economical and effective way of fabricating these wafers. This type of saw blade permits the blade thickness to be substantially reduced when compared with disc-type saw blades and, therefore, reduces the amount of material lost in slicing. In addition, annular saw blades enable thinner slabs to be sliced from a crystal without breakage.

The saw blade is mounted on a spindle plate which is connected to a rotating spindle. The crystal to be sliced is held in a suitable work support or holder located in front of the saw blade and positioned with the portion to be cut projecting into the opening of the inner periphery of the saw blade. Generally, the support is moved in a direction perpendicular to the axis of rotation of the spindle thereby causing the saw blade to cut through the work piece.

The annular blades, often referred to as "inside diameter" or ID blades, are made of very thin copper or stainless steel and have diamond bort around the inside edge of the blade. These blades are relatively thin, for example .005 inch and exhibit a lack of rigidity during the cutting operation. To impart rigidity to an annular ID blade, it is necessary to maintain the blade in tension. The tensioning of the blade is provided by applying a radial force to the blade in a zone spaced from its inner or cutting edge. The application of this force produces circumferential stresses near the inside diameter cutting edge.

The application of the radial force necessary to obtain the proper tensioning of the blade has been heretofore provided in one type of assembly by clamping rings, one of which was provided with a rounded concentric groove, and the other with a mating rounded projection. The projection on one ring forced the flat contacting area of the peripheral portion of the saw blade into the groove in the other as the rings were clamped together. This permanent deformation of the peripheral portion of the saw blade resulted in the establishment of circumferential stresses. However, the permanent nature of this type of deformation resulted in an inability to alter or increase the tensioning of the blade after repeated cutting operations.

Another type of ID saw assembly utilizes clamping rings to hold the blade in combination with a tensioning ring. The tensioning ring is attached to one of the clamping rings after the blade is in clamped position and is characterized by a circumferential projection located inwardly of the clamping rings. This projection deforms the blade when the bolts attaching the tensioning ring to the camping ring are tightened. However, this type of assembly is found to generally produce unsymmetrical stresses in the blade and requires the assembly to be removed from the spindle plate for retensioning. In addition, the unsupported deformation of the blade has been found to result in the blade being damaged by segments flying off the work piece during cutting and striking the blade in the direction of the deformation.

In addition, the permanent deformation produced by mechanical tensioning assemblies renders the removal and recentering of the blade impractical. Since the concentricity of the saw blade is an important requirement in insuring a uniform cut of the crystal, these types of tensioning arrangements result in a substantial number of blades being discarded.

A common characteristic of the present methods of obtaining the necessary tensioning is the inability to vary or control the amount of induced stresses during operation. The use of grooves and mating projections or other similar type deforming surfaces has been found to provide nonuniform tensioning around the periphery of the blade. Further, the mechanical tensioning of the blade by applying a uniform torque to the plurality of bolts located about the periphery is a relatively slow process requiring a substantial number of repetitive steps.

Accordingly, it is an object of the present invention to provide a means for uniformly tensioning the blade about its periphery and, also, to enable the amount of tension to be rapidly changed during continued operation, without requiring the assembly to be removed from the spindle plate. Consequently, the present invention enables an ID saw to be retensioned during continued use and, therefore, extends the useful life of the blade.

SUMMARY OF THE INVENTION

A saw assembly constructed in accordance with the present invention includes first and second annular support elements, at least one of which contains a circumferential recess therein. An annular saw blade having its cutting edge located on the inner peripheral portion thereof is positioned between the first and second support elements. Clamping means are provided for maintaining the saw blade in fixed position between the support elements during operation. The clamping means is located at an outer peripheral portion of the support elements with respect to the location of the circumferential recess. The circumferential recess is contained in the second support element. In addition, the first support element contains at least one channel formed therein. When the blade is positioned and clamped, the recess and channel are substantially aligned on either side of the saw blade.

The channel extends inwardly to and communicates with the surface of the blade. The channel is filled with a fluid medium, such as a water-soluble grease. The application of pressure to the fluid in the channel results in the pressure being transmitted through the medium and establishes unequal pressures on either side of the saw blade. Due to the unequal pressures, the adjacent portion of the saw blade is forced to change its contour and extend into the recess in the second support element. The deformation of the blade permits the fluid to flow circumferentially and results in a circumferential deformation of the blade into the recess. Since the outer peripheral portion of the blade is securely clamped, the bowing of the blade into the recess established the circumferential stresses needed for tensioning.

Due to the fact that the stresses are caused by the application of pressure to the fluid and this pressure is substantially uniform about the entire recess, the stresses are correspondingly uniform about the periphery of the saw blade. To increase the sensitivity of the blade to variations in the pressure applied to the fluid, a plurality of channels may be formed in the second support element. These channels are preferably spaced about the circumference of the element to minimize back pressure in the recess. The pressure in the channel in the first element can be varied by providing valve means at the outer end of the channel. In addition, sealing means such as O-rings may be located in one support element on either side of the recess to insure that the fluid is confined to the volume formed by the deformed blade.

The magnitude of the circumferential stresses induced in the blade is determined in part by the distance that the blade extends into the recess in the second element. Thus, if the blade should require retensioning after a particular period of usage, the application of additional pressure to the fluid results in a retensioning or resetting of the blade to its proper operating condition. Since the blade is clamped between the first and second elements prior to the application of pressure to the fluid material the concentricity of the blade can be checked and adjusted if desired without requiring the insertion of a new blade. In addition, the use of fluid to apply the pressure not only insures uniformity of circumferential stresses about the circumference of the blade but also eliminates any torsional stresses due to a relative rotation between the blade and the tensioning means heretofore employed.

Further features and advantages of the invention will become more readily apparent in the following detailed description of the specific embodiment when taken in conjunction with the accompanying drawing.

DESCRIPTION OF THE PREFERRED EMBODIMENT

Figure 1:
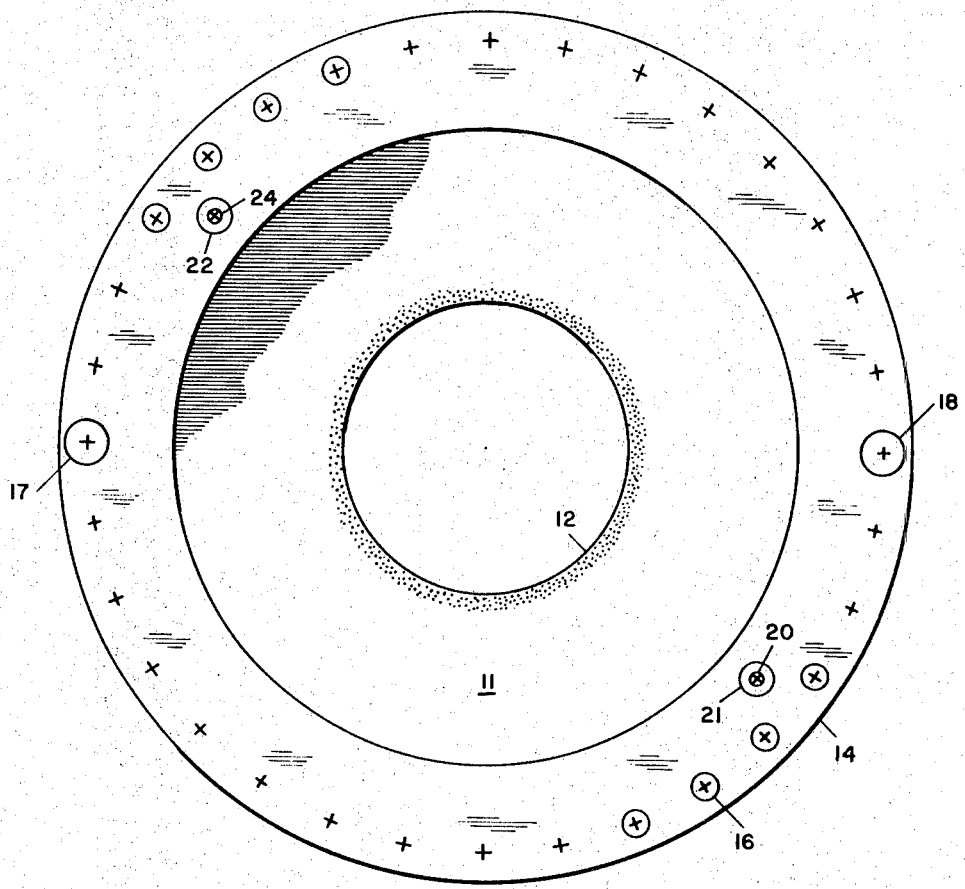
FIG. 1 is a plan view of one embodiment of the invention.

Referring now to FIG. 1, an hydraulically tensioned saw assembly is shown comprising annular saw blade 11 formed of a thin metal, such as stainless steel, with its inner peripheral edge 12 containing an abrasive material. The abrasive material, typically diamond, is shown dotted in FIG. 1.

The saw blade 11 is positioned between first and second clamping rings 14 and 15. The rings are clamped together by clamping bolts 16 located in spaced positions about the outer peripheral portion of ring 14. In addition, locating studs 17 and 18 are also provided in the outer peripheral portion of the rings. These studs are used to initially locate the rings and register the corresponding holes in the blade prior to the insertion of clamping bolts 16. Channel 20 is shown located in and extending inwardly of the inner peripheral portion of ring 14. The channel is provided with a threaded cap member 21. A second and smaller inwardly extending channel 22 is shown diametrically spaced from channel 20 on ring 14 and is provided with threaded cap 24.

Figure 2:
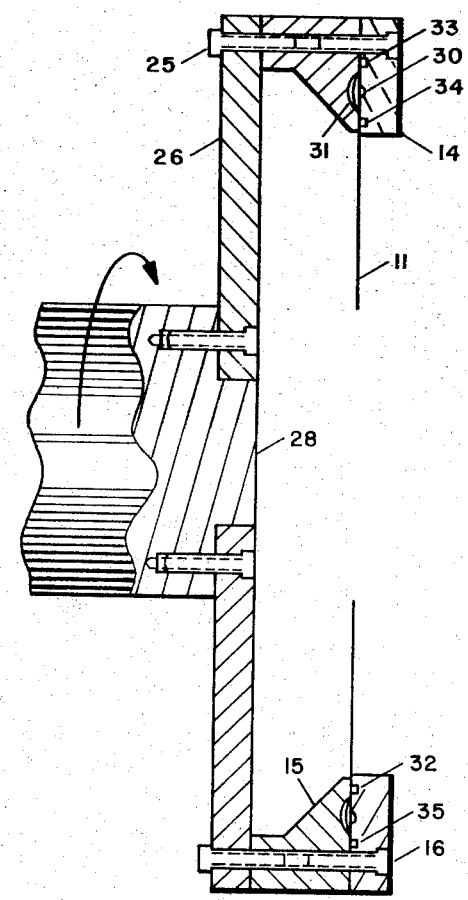
FIG. 2 is a side view in section of the embodiment of FIG. 1.

The constructional details of the assembly are shown more clearly in FIG. 2 wherein blade 11 is clamped between rings 14 and 15 by bolts 16. The entire assembly is fastened to spindle plate 26 by bolts 25. The spindle plate, in turn, is mounted on drive shaft 28 which is connected to a suitable drive motor (not shown). It shall be noted that clamping ring 14 is provided with a circumferential recess 30 spaced inwardly from clamping bolts 16. In addition, ring 15 is provided with recess 31. The recesses, which are of unequal size in the illustrated embodiment, are located on opposite sides of saw blade 11. While both clamping rings contain recesses in the described embodiment, the recess 30 in ring 14 can be eliminated if desired and the deformation of the blade can be utilized thereas.

The recesses are required to be in substantial registration, on either side of the saw blade when the rings are in clamped position. In practice, the recess 30 of ring 14 is preferably smaller in area than and centrally located with respect to recess 31. Further, circumferential seats or recesses 32 and 33 are formed on the inner surface of ring 14 and are located on different sides of recess 30. First and second O-rings 34 and 35 are positioned, as shown, in the corresponding seats 32 and 33. The diameter of the O-rings is required to exceed the depth of their seats in order to effect a seal when the rings 14 and 15 are in clamped position.

As mentioned, recess 30 in ring 14 is coupled by channel 20 to the outer surface of the ring. The recess and channel are filled with a fluid, such as grease. Channel 22 serves as a vent during the filling of the recess. The presence of O-rings 34 and 35 insure that the grease will be maintained at least within the volume bounded by blade 11 and ring 14. The application of pressure to the grease via channel 20 results in the establishment of unequal pressures on the opposing surfaces of the saw blade 11. Since the outer peripheral portion of the saw blade is clamped, the unequal pressures result in the establishment of circumferential stresses in the saw blade. As a result, the blade is tensioned and its rigidity enhanced. The amount of circumferential stress is a function of the deformation of the saw blade or, stated in other terms, the amount of extension of blade 11 into recess 31 determines the rigidity of the blade during operation. Due to the fact that first recess 30 is substantially smaller than recess 31, the force supplied to the blade results in a substantially even rather than abrupt deformation. Consequently, the deformation is substantially elastic rather than permanent. In addition, the degree of deformation can be varied by varying the pressure on the grease in channel 20.

Figure 3:
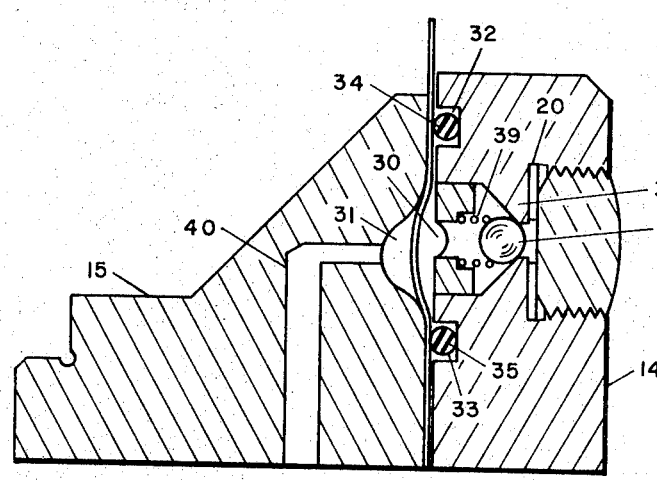
FIG. 3 is a sectional view taken along lines A–A of FIG. 1.

In the embodiment shown, the pressure on the grease is readily maintained during operation by locating a ball valve at the end of channel 20. As seen in FIG. 3, channel 20 contains ball member 35 urged against conical seat 38 by biasing means 39. The removal of threaded cap 21 enables grease to be applied under pressure to the narrow portion of channel 20 and thereby force ball 36 against biasing means 39. This increases the pressure on the portion of the saw blade proximate to recess 30. Upon removal of the source of pressure from channel 20, the ball 36 seats itself and maintains the pressure within recess 30. The fluid or grease uniformly transmits the pressure within the peripheral recess 30. Consequently the forces applied to the surface of blade 11 are essentially uniform about its entire circumference. As a result, the circumferential stresses are uniform.

The seals provided by O-rings 34 and 35 insure that no pressure is lost by virtue of the grease leaking from the volume bounded by the deformed blade. Since the saw blade extends into recess 31 in accordance with the amount of pressure applied, recess 31 is provided with a venting channel 40. Channel 40 improves the sensitivity of the blade to different applied pressures since it is unsealed and thereby eliminates back pressure.

In operation, the annular saw is rotated about the axis of the spindle. Then, the work piece is brought into contact with the blade and the slicing operation performed. After a prolonged period of operation during which many wafers are formed, the blade is normally required to be retensioned. To effect retensioning, it is only required that the pressure on the grease in recess 30 be increased. This can be provided in a relatively short period without demounting the saw assembly from the spindle plate by merely removing cap 21 and seating a grease gun therein. In one embodiment tested and operated, the initial grease pressure was approximately 1,200 psi. After cutting 50 silicon wafers at a speed of about 3,400 r.p.m. the blade was retensioned by the addition of 200 psi. The subsequent cutting operations on silicon stock were found to be as effective as the initial ones thereby indicating that the rigidity of the blade had been restored and the operational life of the blade increased. It shall be noted that the present saw assembly provides support for the blade on both sides of the deformation and thereby reduces the likelihood of blade damage during operation.

While the above description has referred to a specific embodiment of the invention, it will be recognized that many modifications and variations may be made therein without departing from the scope of the invention.

We claim:
1. A holder for an annular saw having an internal diameter cutting edge comprising:
 a. a first annular support element;
 b. a second annular support element containing a circumferential recess therein;
 c. means for clamping the annular saw between said first and second support elements, said clamping means engaging an outer peripheral portion of said support elements; and
 d. at least one channel formed in said first support element, said channel extending inwardly to and communicating with the side of the saw, said channel containing a fluid, the application of pressure to said fluid causing a deformation of an adjacent circumferential potion of the blade into the recess in said second support element whereby the blade is tensioned.

2. Apparatus in accordance with claim 1 further comprising valve means located in said first channel, said valve means permitting the pressure of said fluid and the blade tension to be varied.

3. Apparatus in accordance with claim 2 further comprising sealing means located in said first support element for confining the fluid to the volume formed by the deformation of the blade.

4. Apparatus in accordance with claim 3 further comprising at least one channel formed in said second support element, said channel extending inwardly to and communicating with the recess therein.

5. Apparatus in accordance with claim 4 wherein said first annular support element contains a circumferential recess therein, said recess being located so as to be in substantial registration with the recess in said second element when the blade is in clamp position, said recess in the first element communicating with the channel therein.

6. Apparatus in accordance with claim 5 wherein said first element contains first and second channels formed therein each of said channels extending inwardly to and communicating with the recess therein.

7. Apparatus in accordance with claim 6 wherein said sealing means comprises first and second O-rings contained in corresponding circumferential seats formed in said first support elements.

8. A holder for an annular saw having an internal diameter cutting edge comprising:
   a. a first annular support element containing a first circumferential recess therein;
   b. a second annular support element containing a second circumferential recess therein;
   c. means for clamping the annular saw between said first and second support elements, said clamping means engaging an outer peripheral portion of the support elements with respect to the recesses therein, said first and second recesses being adjacently located on opposing sides of the saw when the saw is in clamped position;
   d. first and second channels formed in the first support element, said channels extending into the first recess;
   e. valve means located in said first channel for maintaining the pressure of a fluid introduced into the first recess, said second channel being sealed when the fluid is contained within the first recess; and
   f. at least one channel formed in the second support element and extending into the second recess, the application of pressure to the fluid in said first recess resulting in a tensioning of the clamped saw.

9. Apparatus in accordance with claim 8 further comprising sealing means located in said first support element on opposing sides of the first recess, said sealing means confining the fluid contained in said first recess.